(12) United States Patent
Cheong et al.

(10) Patent No.: US 6,535,973 B1
(45) Date of Patent: Mar. 18, 2003

(54) METHOD AND SYSTEM FOR SPECULATIVELY ISSUING INSTRUCTIONS

(75) Inventors: Hoichi Cheong, Austin, TX (US); Maureen A. Delaney, Richmond, VT (US); Hung Qui Le, Austin, TX (US); Robert McDonald, Austin, TX (US); Dung Quoc Nguyen, Austin, TX (US); David Wayne Victor, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/383,606

(22) Filed: Aug. 26, 1999

(51) Int. Cl.⁷ .............................................. G06F 9/312
(52) U.S. Cl. ...................................... 712/218; 712/216
(58) Field of Search ................................ 712/218, 215, 712/216

(56) References Cited

U.S. PATENT DOCUMENTS 5,859,991 A * 1/1999 Narayan ...................... 712/204
5,860,104 A * 1/1999 Witt ............................. 711/137
6,098,166 A * 8/2000 Leibholz et al. ............ 712/215
6,237,081 B1 * 5/2001 Le et al. ...................... 712/205

* cited by examiner

Primary Examiner—Eric Coleman
(74) Attorney, Agent, or Firm—Casimer K. Salys; Bracewell & Patterson, L.L.P.

(57) ABSTRACT

A method and system for speculatively issuing instructions which are dependent upon results from execution of other instructions. Instructions are speculatively issued, dependent upon a result from execution of a primary instruction, wherein the speculatively issued instructions are issued after execution of the primary instruction. N clock cycles are tracked after execution of the primary instruction, wherein the result from execution of said primary instruction is expected within n clock cycles. Execution of any speculatively issued instructions which are dependent upon the primary instruction is cancelled if the result is not returned from execution of the primary instruction within n clock cycles, such that for primary instructions for which the result is returned within the expected n clock cycles any speculatively issued instructions dependent upon said result are executed with increased efficiency.

10 Claims, 7 Drawing Sheets

METHOD AND SYSTEM FOR SPECULATIVELY ISSUING INSTRUCTIONS

BACKGROUND OF THE INVENTION

1. Technical Field

The present invention relates in general to an improved data processing system and in particular to an improved method and system for speculatively issuing instructions in a data processing system. Still more particularly, the present invention relates to an improved method and system for speculatively issuing instructions in a data processing system which are dependent upon data from previously executed instructions for which a result is expected within n clock cycles.

2. Description of the Related Art

In modern microprocessors, it is advantageous to support speculative execution of instruction using branch prediction mechanisms, out-of-order execution, and multiple pipelines in order to increase the number of instructions being processed concurrently. As the available clock frequency increases in microprocessors, the number of pipeline stages for a microprocessor are also increasing. Consequently, the number of active instructions within a pipeline that are in various stages of execution also increases. For example, the number of clock cycles between the time a load instruction is issued until the time a cache hit is returned for the load instruction has increased significantly with the increase in pipeline stages.

While these advancements in microprocessor clock frequency provide substantial enhancement of performance, the increase in pipeline stages causes undesirable complexity when utilizing a conventional method for speculative execution. Therefore, for a deep-pipelined microprocessor, a method is still needed for a microprocessor to forgo results computed by speculatively executed instructions and to restore the microprocessor to a particular state prior to the point when the speculative execution starts. For example, when a load instruction is executed, but a cache hit is not returned, any instructions speculatively issued after the load instruction must be aborted until the data can be retrieved from storage. In improving the performance of the microprocessor, there must be an issuance of subsequent instructions that depend on the load instruction so that if the load instruction returns a cache hit, then the latency between the load instruction and dependent instructions is minimized. However, while it is desirable to minimize the latency for cache hits, the method of minimizing should also minimize latency when there is not a cache hit.

SUMMARY OF THE INVENTION

It is therefore one object of the present invention to provide an improved data processing system.

It is another object of the present invention to provide an improved method and system for speculatively issuing instructions within a data processing system.

It is yet another object of the present invention to provided an improved method and system for speculatively issuing instructions within a data processing system which are dependent upon data from previously executed instructions for which a result is expected after n clock cycles.

The foregoing objects are achieved as is now described. A method and system for speculatively issuing instructions which are dependent upon results from execution of other instructions is provided. Instructions are speculatively issued, dependent upon a result from execution of a primary instruction, wherein the speculatively issued instructions are issued after execution of the primary instruction. N clock cycles are tracked after execution of the primary instruction, wherein the result from execution of said primary instruction is expected within n clock cycles. Execution of any speculatively issued instructions which are dependent upon the primary instruction is cancelled if the result is not returned from execution of the primary instruction within n clock cycles, such that for primary instructions for which the result is returned within the expected n clock cycles any speculatively issued instructions dependent upon said result are executed with increased efficiency.

BRIEF DESCRIPTION OF THE DRAWINGS

The novel features believed characteristic of the invention are set forth in the appended claims. The invention itself, however, as well as a preferred mode of use, further objects and advantages thereof, will best be understood by reference to the following detailed description of an illustrative embodiment when read in conjunction with the accompanying drawings, wherein:

DESCRIPTION OF THE PREFERRED EMBODIMENT

Figure 1:
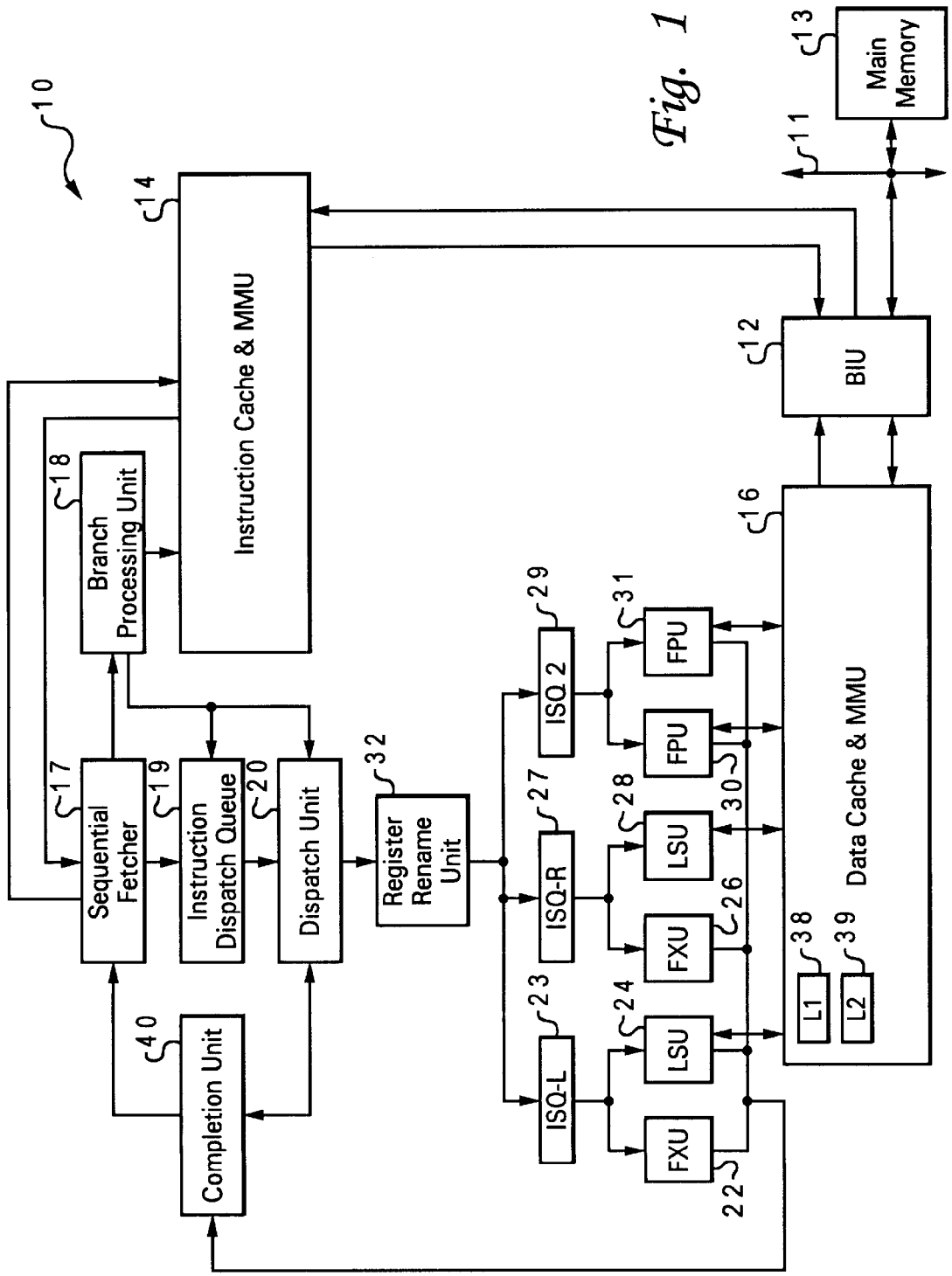
FIG. 1 depicts an illustrative embodiment of a processor for processing data in accordance with the present invention.

With reference now to the figures and in particular with reference to FIG. 1, there is depicted a block diagram of an illustrative embodiment of a processor, indicated generally at 10, for processing data in accordance with the present invention. In the depicted illustrative embodiment, processor 10 comprises a single integrated circuit superscalar microprocessor. Accordingly, as discussed further below, processor 10 includes various execution units, registers, buffers, memories, and other functional units, which are all formed by integrated circuitry. Processor 10 preferably comprises one of the PowerPC line of microprocessors available from IBM Microelectronics, such as the PowerPC 604, which is described in detail in PowerPC 604 RISC Microprocessor User's Manual (available from IBM Microelectronics as Order No. MPR604UMU-01 and incorporated herein by reference); however, those skilled in the art will appreciate from the following description that the present invention can advantageously be implemented within other suitable processors, particularly those which track load instructions and instructions dependent thereon.

As illustrated in FIG. 1, processor 10 is coupled to bus 11 via a bus interface unit (BIU) 12 within processor 10. BIU 12 controls the transfer of information between processor 10 and other devices coupled to bus 11, such as lower level cache (not illustrated) or main memory 13, which together with processor 10 and bus 11 form a fully functional data processing system. BIU 12 is also connected to instruction cache 14 and data cache 16 within processor 10. High-speed caches, such as instruction cache 14 and data cache 16, enable processor 10 to achieve relatively fast access times to a subset of data or instructions previously transferred from lower level memory to caches 14 and 16, thus improving the overall performance of the data processing system. Each cache 14 and 16 may include multiple levels of cache embedded within such as L1 cache 38 and L2 cache 39. Instruction cache 14 is further connected to sequential fetcher 17, which fetches up to a cache line of instructions from instruction cache 14 during each clock cycle and transmits the fetched instructions to both branch processing unit(BPU) 18 and instruction dispatch queue 19. Branch instructions are retained by BPU 18 for execution and are cancelled from instruction dispatch queue 19; sequential instructions, on the other hand, are cancelled from BPU 18 and buffered within instruction dispatch queue 19 for subsequent execution by sequential instruction execution circuitry within processor 10.

In the depicted illustrative embodiment, in addition to BPU 18, the execution circuitry of processor 10 comprises multiple execution units for sequential instructions, including one or more fixed point units (FXU) 22 and 26, load-store units (LSU) 24 and 28 and floating-point units (FPU) 30 and 31. As is well known to those skilled in the computer arts, each of execution units 22, 24, 26, 28, 30 and 31 typically executes one or more instructions of a particular type of sequential instructions during each processor cycle. For example, FXU(s) 22 and 26 perform integer mathematical and logical operations such as addition, subtraction, ANDing, ORing, and XoRing, utilizing source operands received from an instruction queue(ISQ) of ISQ-L 23 or ISQ-R 27. FPU(s) 30 and 31 typically perform single and double-precision floating-point arithmetic and logical operations, such as floating-point multiplication and division, on source operands received from register unit 32. Both FXU(s) 22 and 26 and FPU(s) 30 and 31 output data results to a register rename unit 32, which temporarily stores the data results until the data results are written into memory. Also depicted, LSU(s) 24 and 28 typically execute floating-point and fixed-point instructions which either load data from memory(i.e. either data cache 16 or main memory) into register rename unit 32 or which store data from register rename unit 32 to memory.

The present embodiment illustrates two identical clusters of execution units where a left cluster includes ISQ-L 23, FXU 22, and LSU 24 and the right cluster includes ISQ-R 27, FXU 26 and LSU 28. A register rename unit 32, which preferably includes general purpose registers and a mechanism for renaming registers, directs instructions to the FXU/LSU clusters. While two clusters of execution units have been depicted, in alternate embodiments, additional clusters of execution units may be included. In addition, for purposes of description, ISQ-L 23, ISQ-R 27 and ISQ2 29 may be referred to generically as an ISQ where either the right or the left cluster may be utilized.

Processor 10 employs both pipelining and out-of-order execution of instructions to further improve the performance of its superscalar architecture. Accordingly, instructions can be executed opportunistically by FXU(s) 22 and 26, LSU(s) 24 and 28 and FPU(s) 30 and 31 in any order as long as data dependencies and antidependencies are observed. In addition, as is typical of many high-performance processors, each instruction is processed at a number of pipeline stages, including fetch, decode/dispatch, execute, finish and completion/writeback.

During the fetch stage, sequential fetcher 17 retrieves up to a cache line of instructions from instruction cache 14. Preferably, up to eight cycles of data are fetched in a single cache line, however in alternate embodiments additional cycles of data may be fetched. As noted above, sequential instructions fetched from instruction cache 14 are buffered within instruction dispatch queue 19, while branch instructions are processed at each of the remaining pipeline stages by circuitry within BPU 18.

During the decode/dispatch stage, dispatch unit 20 decodes and dispatches one or more sequential instructions from instruction dispatch queue 19 to an ISQ through register rename unit 32. ISQ(s) 23, 27 and 29 are preferably reservation stations that store instructions dispatched to particular execution units until operands or execution resources become available. During the decode/dispatch stage, register rename unit 32 acquires renamed source registers and allocated destination registers for each instruction in addition to other data as will be further described. In addition, register rename unit 32 contains a copy of each instruction. In the depicted illustrative embodiment, instructions dispatched by dispatch unit 20 are also passed to a completion buffer within completion unit 40. Processor 10 tracks the program order of the dispatched instruction during out-of-order execution utilizing unique instruction identifiers associated with the instructions in the completion buffer of completion unit 40.

In the present embodiment, with each entry in register rename unit 32, for each instruction not yet completed, particular data is maintained for associated destination registers. Destination registers are those which have been allocated for storing the result from execution of an instruction. In other alternate embodiments, additional fields of data may be maintained. Table 1 illustrates the record format of the register status data stored for each destination register within register rename unit 32.

TABLE 1

Record Format for Register Status Data

| Field | Description |
| --- | --- |
| Rtag | physical register identifier |
| W | writeback status |
| LDL (2:0) | left dependence bits |
| RDL (2:0) | right dependence bits |

The Rtag identifies the physical register to which a destination register for an instruction is assigned. The Rtag is typically a numerical value of a physical position within register rename unit 32 which corresponds to an identifier for the destination of the result of an instruction executing. For example, the expected result of a load operation is data gathered from a position in memory which is then placed in a particular destination register as determined by the load instruction within register rename unit 32. The W bit indicates whether the result of the operation of the instruction has been written to the destination register. As will be further illustrated, the W bit is often set speculatively according to the present invention. The combination of the W bit and LDL and RDL bits is utilized to track speculative execution and allow for instructions which are dependent upon a load instruction to issue prior to a cache hit for the load being returned.

The LDL and RDL fields each preferably utilize three bits, however in alternate embodiments may utilize other multiples of bits. In particular, the number of bits of the LDL and RDL fields indicates the number of clock cycles which are expected between the time that an instruction executes and when the result of execution is available in the destination register. For example, in the present embodiment, the expected time for a result from a load instruction to return, also known as a cache hit, is three clock cycles. Also, in particular, LDL indicates that the data in the entry is dependent on a load from the left LSU. RDL indicates that the data in the entry is dependent upon a load from the right LSU. In some references where the dependency to the right LSU or left LSU is not imperative, the dependency bits are referred to as DL bits. Further, DL bits might be utilized to indicate that a data entry is dependent upon a load from other execution units within a processor.

The cluster of LSU execution units are supported by an ISQ-L 23 and ISQ-R 27 where each ISQ preferable maintains particular issue status data presented in Table 2 for each instruction. In alternate embodiments, additional issue status data may be maintained. By processor 10, up to two instructions may be written to each ISQ per clock cycle. In addition, one load/store instruction and one FXU instruction are issued per clock cycle from each ISQ. Table 2 illustrates the record format of the issue status stored for each instruction within each ISQ. The V bit indicates whether the entry is valid in the ISQ, while the IV bit indicates whether the entry has been issued.

TABLE 2

Record Format for Issue Status

| Field | Description |
| --- | --- |
| V | entry valid bit |
| IV | issue valid bit |

Figure 2:
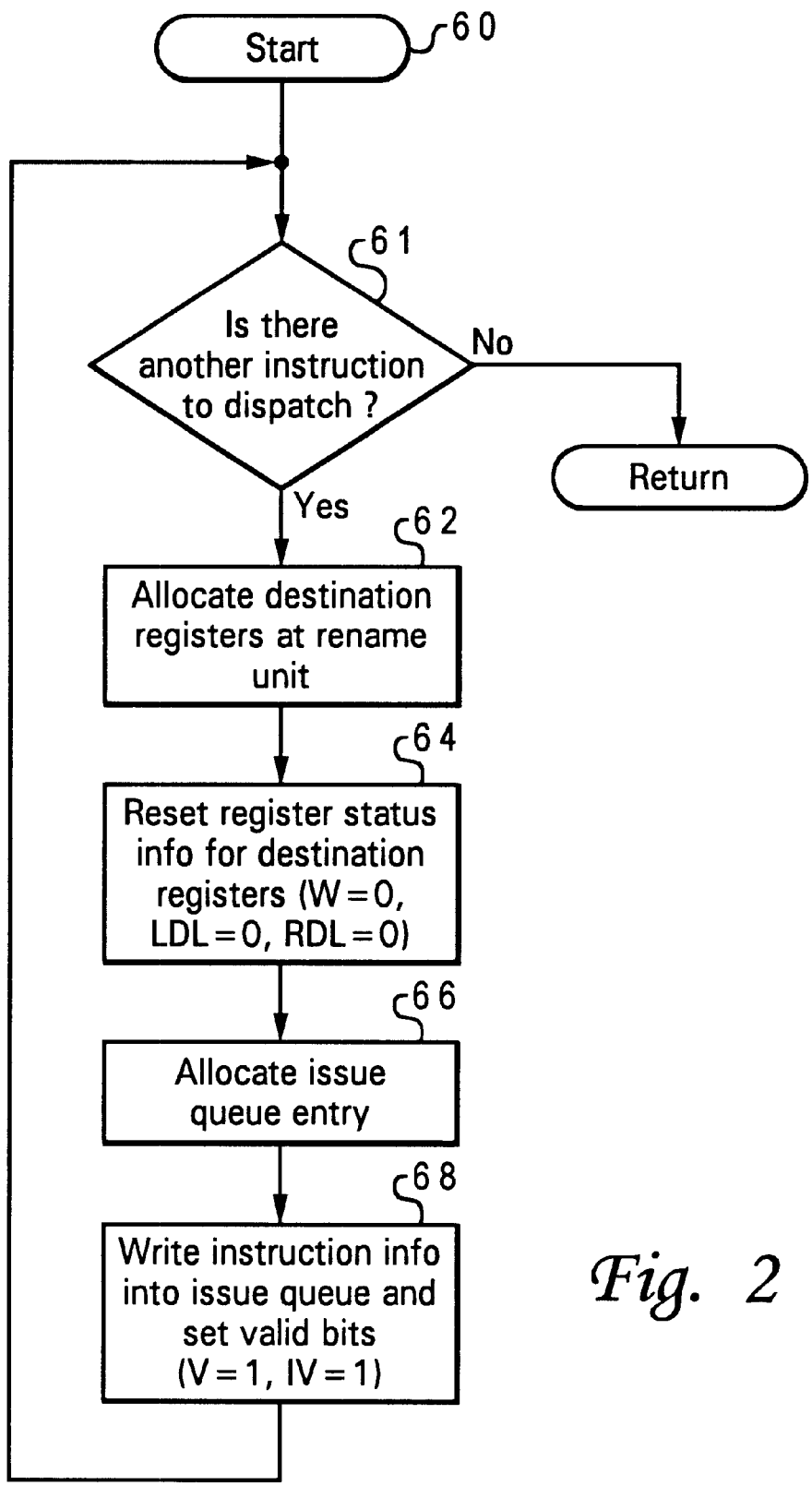
FIG. 2 illustrates a high level logic flowchart depicting a dispatch process for instructions in accordance with the present invention.

Referring now to FIG. 2, there is depicted a high level logic flowchart depicting a dispatch process for instructions, according to the present invention. In particular, the process illustrated occurs each clock cycle of operation. The process starts at block 60 and proceeds to block 61. Block 61 illustrates a determination of whether there is another instruction to dispatch. If there are not any instructions to dispatch, the process returns. If there are additional instructions to dispatch, the process passes to block 62. Block 62 depicts the allocation of destination registers within the register rename unit. Thereafter, block 64 illustrates resetting the register status data depicted in Table 1 for the destination registers (W=0, LDL=0 and RDL=0). Next, block 66 depicts allocating an issue queue entry for the instruction. Thereafter, block 68 illustrates writing the instruction into the issue queue and setting the valid bits (V=1, IV=1) as illustrated in Table 2. Next, the process passes to block 61.

In addition to issue status data, within each ISQ, for each instruction, addition issue queue entry data is maintained. Table 3 depicts the fields and description thereof of the issue queue entry data.

TABLE 3

Record Format for Issue Queue Entry

| Field | Description |
| --- | --- |
| Issue status | issue status record (V and IV bits) |
| d_rtaq | destination register rtag |
| d_valid | destination register valid |

TABLE 3-continued

Record Format for Issue Queue Entry

| Field | Description |
| --- | --- |
| s0_status | source zero reqister status |
| s1_status | source one register status |
| s2_status | source two register status |
| misc | other tags, opcodes and data |

The d_rtag value is the physical register value for the destination of the result of the instruction operation within register rename unit 32. The d_valid value indicates whether the instruction will write a result into the register. The s0_status, s1_status, and s2_status values indicate the status of the W bit for each source needed by the instruction. For some operations, not all source register status values will be utilized. In addition, other misc data may be stored with the issue queue entry, however is not described within the scope of the present invention.

During the execute stage, execution units 22, 24, 26 and 28 execute instructions issued from ISQ-L 23 or ISQ-R 27. After execution of an instruction has terminated, execution units 22, 24, 26 and 28 store data results of the instruction within either register unit 32 or data cache 16, depending on the instruction type. In addition, execution units 22, 28 and 30 notify completion unit 40 of which instructions stored within the completion buffer of completion unit 40 have finished execution. Instructions are then completed by completion unit 40 in program order by marking the instructions as complete in the completion buffer.

Figure 3:
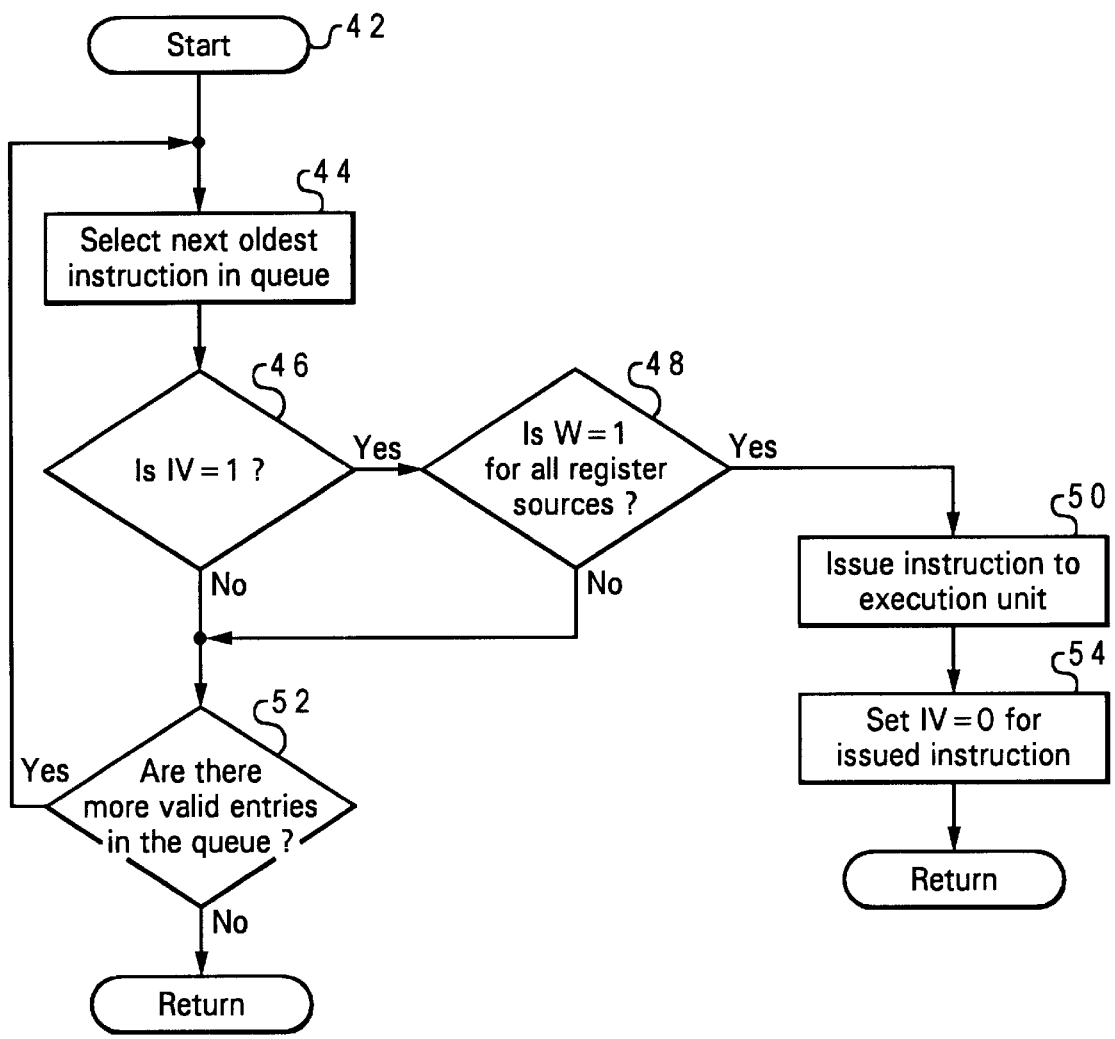
FIG. 3 depicts a high level logic flowchart depicting an issue selection process for each instruction in each ISQ.

With reference now to FIG. 3, there is illustrated a high level logic flowchart depicting an issue selection process for each instruction in each ISQ in accordance with the present invention. In particular, the process depicted occurs in each ISQ for each clock cycle of operation. The process starts at block 42 and proceeds to block 44. Block 44 depicts the selection of the next oldest instruction in the queue. Thereafter, block 46 illustrates a determination of whether the IV bit for the instruction is set to "1". If the IV bit for the instruction is not set to "1", then the process passes to block 52. Block 52 depicts a determination of whether there are other valid entries in the queue. If there are not any other valid entries in the queue, the process returns. If there are other valid entries in the queue, the process passes to block 44.

Returning to block 46, if the IV bit for the entry is set to "1", the process passes to block 48. Block 48 illustrates a determination of whether or not the W bit is set to "1" for all register sources of the entry. In particular, the issue queue entry data includes a source status bit for each status which is the W bit for that register in the register rename unit. If the W bit is not set to "1", the process passes to block 52. If the W bit is set to "1" for all register sources of the entry, then the process passes:to block 50. Block 50 depicts the issuance of the instruction to the execution unit. Thereafter, block 54 illustrates setting the IV bit to "0" for the issued instruction.

Figure 4:
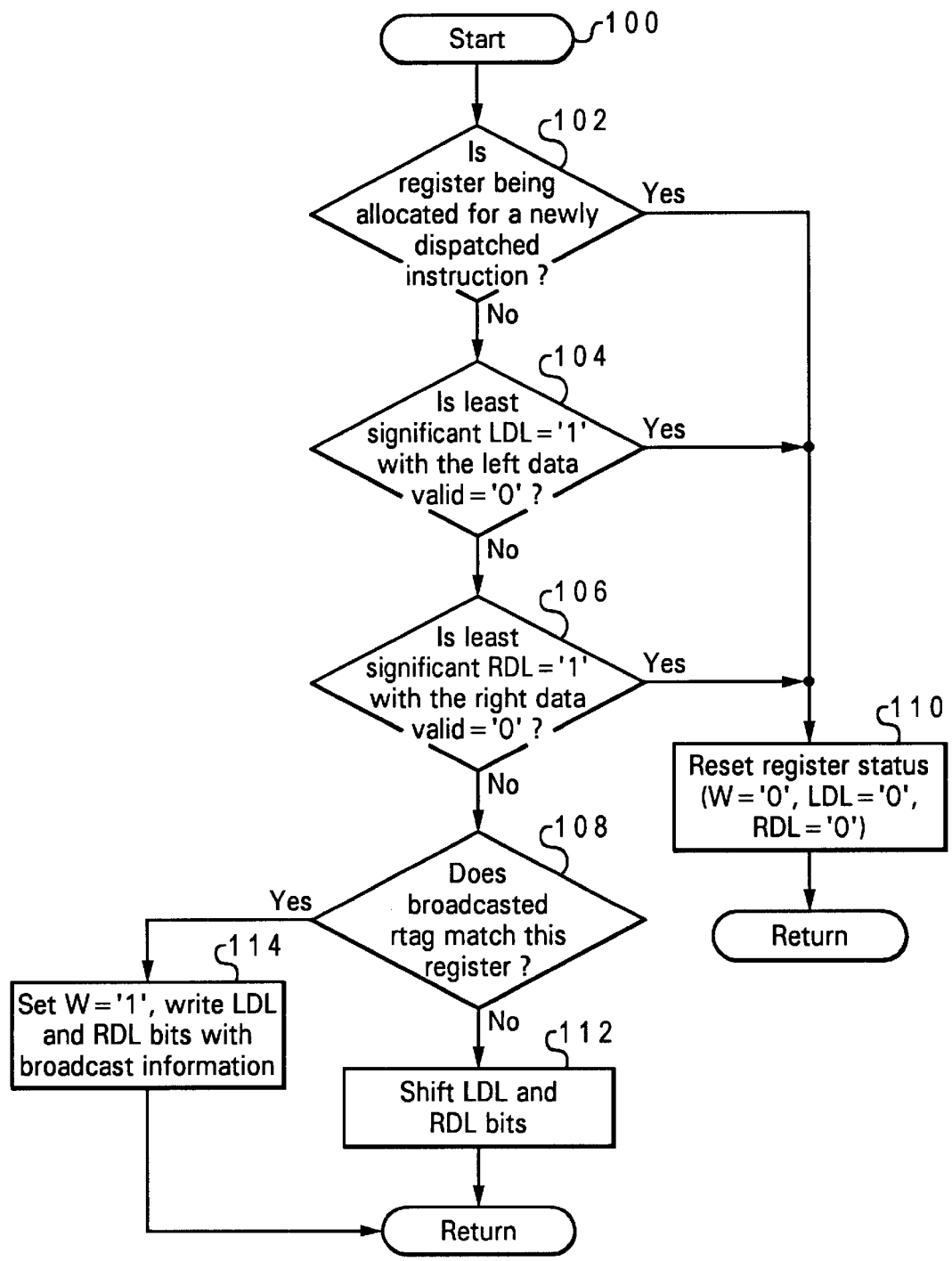
FIG. 4 illustrates a high level logic flowchart of a process for updating the register status data for each entry.

With reference now to FIG. 4, there is illustrated a high level logic flowchart of a process for updating the register status data for each entry in the register rename unit. In particular, the process depicted occurs for each register status record on every clock cycle. The process starts at block 100 and proceeds to block 102. Block 102 depicts a determination of whether there is a register being allocated for a newly dispatched instruction. If there is a register being allocated, the process passes to block 110. Block 110 illustrates resetting the register status to W="0", LDL="0" and RDL="0", whereafter the process returns. At block 102, if there is not a register being allocated, the process passes to block 104. Block 104 illustrates a determination of whether the least significant LDL bit="1" with left data valid="0" for the entry. If the condition of block 104 is true, the process passes to block 110. If the condition of block 104 is not true, the process passes to block 106.

Block 106 depicts a determination of whether the least significant RDL bit="1" with left data valid="0" for the entry. If the condition of block 106 is true, the process passes to block 110. If the condition of block 106 is not true, the process passes to block 108. Block 108 depicts a determination of whether the broadcasted Rtag matches this register, where the process illustrated is run for each register with register status data. If the broadcasted Rtag does not match the register, the process passes to block 112. Block 112 illustrates shifting the LDL and RDL bits for the entry. If the broadcasted Rtag does match the register, the process passes to block 114. Block 114 illustrates setting the W bit to "1" and writing the LDL and RDL bits with broadcast information. Thereafter, the process returns.

Figure 5:
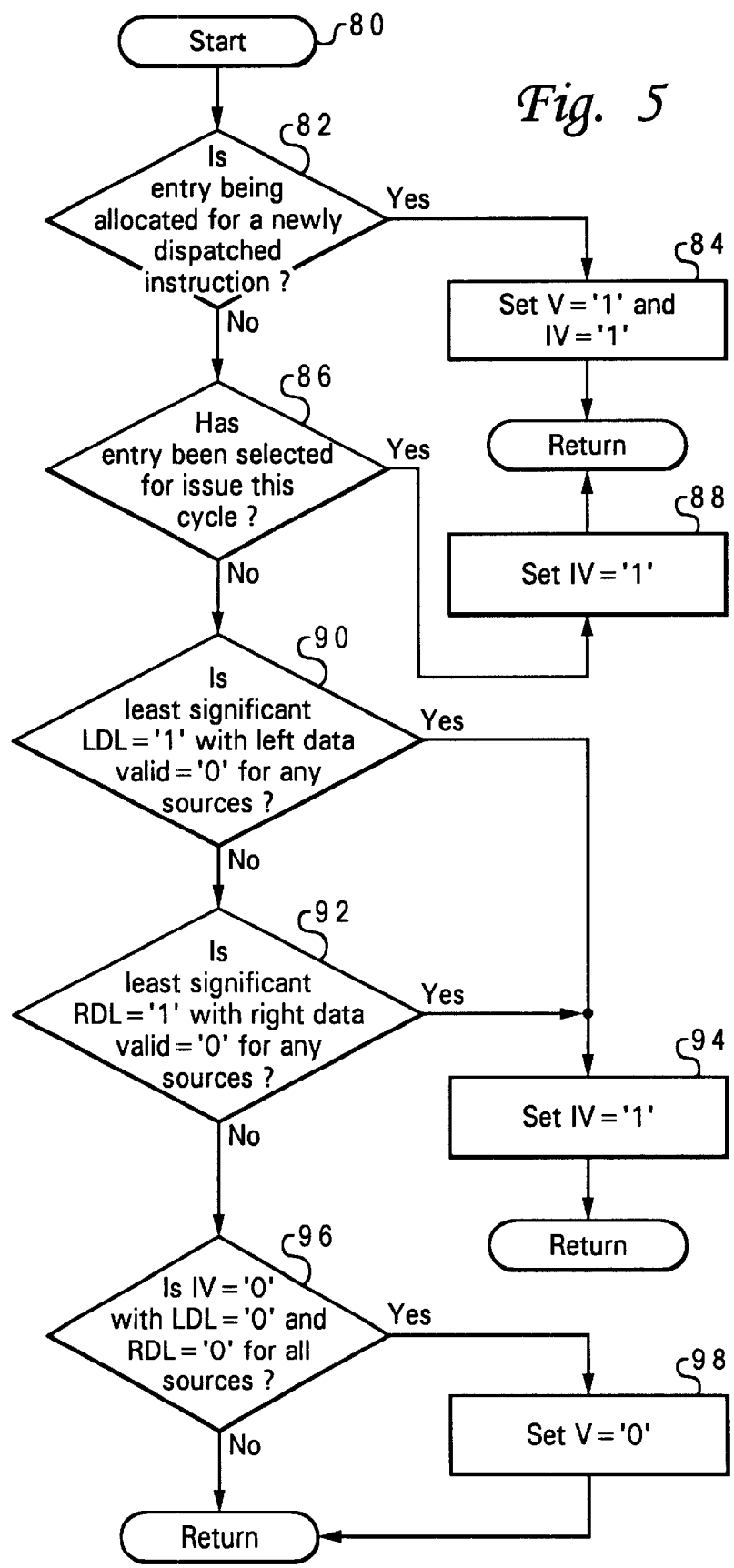
FIG. 5 depicts a high level logic flowchart illustrating process for updating the issue status of each instruction.

Referring now to FIG. 5, there is depicted a high level logic flowchart illustrating a process for updating the issue status of each instruction. In particular, the process depicted occurs for each issue queue entry on every clock cycle. The process starts at block 80 and proceeds to block 82. Block 82 depicts a determination of whether the entry being allocated for is a newly dispatched instruction. If the entry being allocated for is a newly dispatched instruction, the process passes to block 84. Block 84 illustrates setting V="1" and IV="1" for the entry whereafter the process returns. At block 82, if the entry being allocated for is not a newly dispatched instruction, the process passes to block 86. Block 86 depicts a determination of whether the entry has been selected for issue during the present clock cycle. If the entry has been selected for issue during the present clock cycle, the process passes to block 88. Block 88 illustrates setting the IV bit to "0" for the entry, whereafter the process returns.

Returning to block 86, if the entry has not been selected for issued during the present clock cycle, the process passes to block 90. Block 90 depicts a determination of whether the least significant LDL bit="1" with the left data valid="0" for any sources needed by the entry. If the least significant LDL bit="1" with the left data valid="0" for any sources needed by the entry, the process passes to block 94. Block 94 illustrates setting the IV bit for the instruction to "1", whereafter the process returns. At block 90, if the condition is not true, the process passes to block 92. Block 92 depicts a determination of whether the least significant RDL bit="1" and the right data valid="0" for any sources of the entry. If the least significant RDL bit="1" and the right data valid="0" for any sources of the entry, the process passes to block 94. If the condition is not true at block 92, the process passes to block 96. Block 96 illustrates a determination of whether IV="0" with LDL="0" and RDL="0" for all sources. If the condition at block 96 is true, the process passes to block 98. Block 98 depicts setting V="0" for the instruction. With V="0", the entry is deallocated from the ISQ and register rename unit. If the condition at block 96 is not true, the process returns. In particular, only instructions that depend on loads, or other primary instructions with an expected delay in result, need be kept in the ISQ longer (or while their DL bits are active). Instructions that do not depend on loads are released from the issue queue as soon as they are issued in order to utilize the queue most efficiently.

Figure 6:
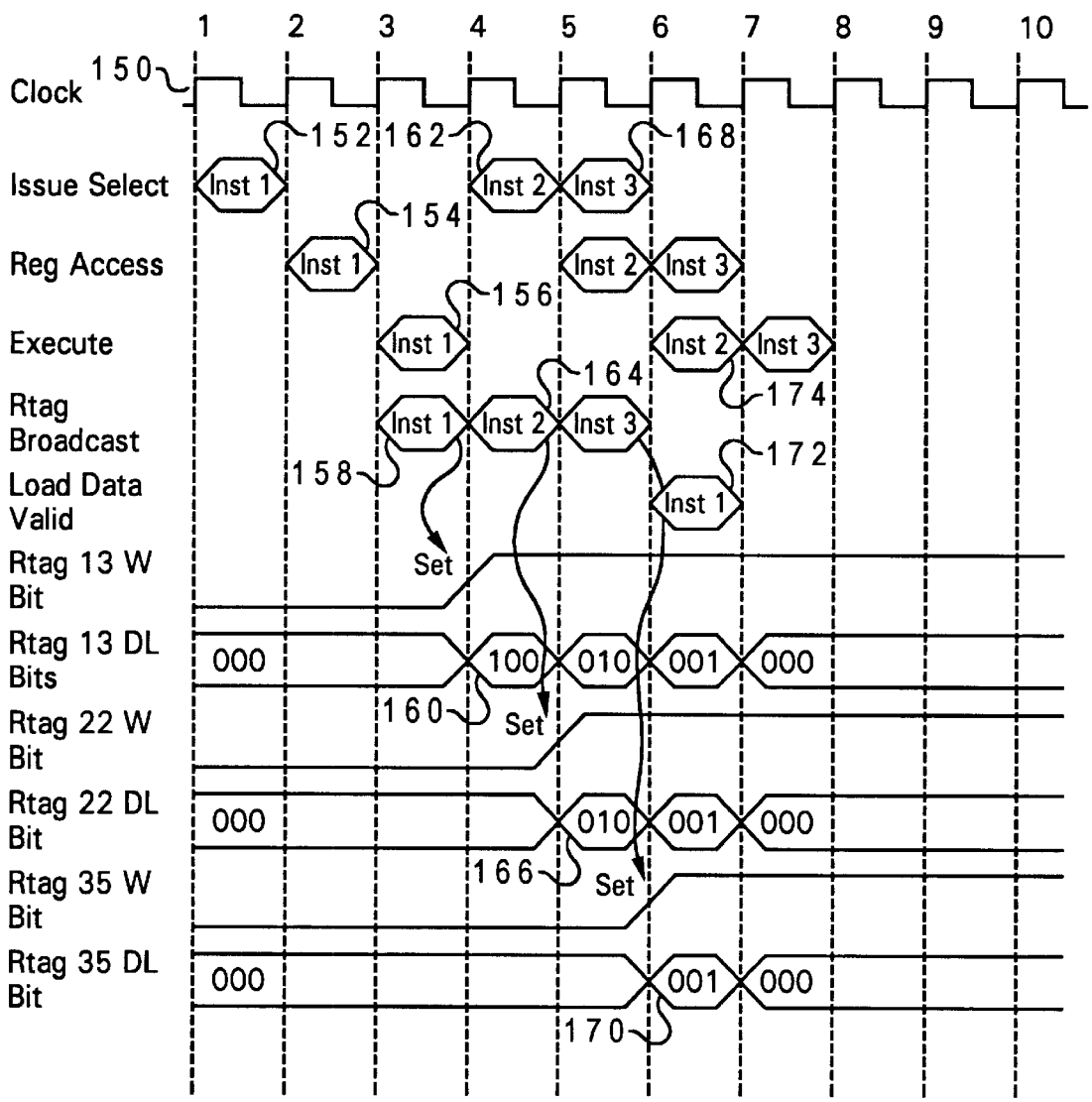
FIG. 6 illustrates a timing diagram depicting a load process which results in a cache hit for a particular example.

With reference now to FIG. 6, there is depicted a timing diagram depicting a load process which results in a cache hit for a particular example. In the example illustrated, inst1 loads the data from location g0 into location g1. The rtag of the destination g1 is assigned at register position "13" in the register rename unit. Next, inst2 adds the data from location g1 with 4 and stores the result at location g2. Inst2 is dependent on the data loaded in inst1 to location g1. The rtag of the destination g2 is assigned at register position "22" in the register rename unit. Inst3 adds the data from location g2 to 4 and stores the result at location g3. Inst3 is directly dependent on data loaded in inst2 to location g2 and indirectly dependent on data loaded in inst1 to location g1.

A clock cycle depicted at reference numeral 150 determines the multiple clock cycles during which instructions are processed. During the first clock cycle, the load instruction inst1 is issued within the LSU as illustrated at reference numeral 152. During the second clock cycle, the register rename unit is accessed as depicted at reference numeral 154. Next, the load instruction is executed during the third clock cycle as illustrated at reference numeral 156. In addition, an rtag for the destination register of the load instruction is broadcast as depicted at reference numeral 158.

The broadcasting of the rtag of "13" sets the W bit to "1" and the DL bits to "100" for the rtag position of "13" within the register rename unit during the fourth clock cycle as illustrated at reference numeral 160. By setting the W bit of g1 to "1", instructions with a source of g1 can proceed while maintaining DL bits in case of a cache miss. Thereby, during the fourth clock cycle, inst2 is issued as depicted at reference numeral 162. Further, when inst2 is issued, the rtag of "22" for the destination of the instruction is broadcast as illustrated at reference numeral 164. The broadcasting of the rtag of "22" sets the W bit to "1" and the DL bits to "010" for the rtag position of "22" during the fifth clock cycle as depicted at reference numeral 166. Thereafter, during the fifth clock cycle, inst3 is issued and the rtag for inst3 of "35" is broadcast as illustrated at reference numeral 168.

During the sixth clock cycle, the W bit is set to "1"and the DL bits are set to "001" for rtag "35" as depicted at reference numeral 170. In addition, the load data valid for inst1 is returned as "1" or valid as illustrated at reference numeral 172. Thereby, the data loaded by inst1 into g1 or destination register "13" is available at the anticipated time for use when inst2 executes as depicted at reference numeral 174. In addition, the result of execution of inst2 will be available when inst3 executes.

Figure 7:
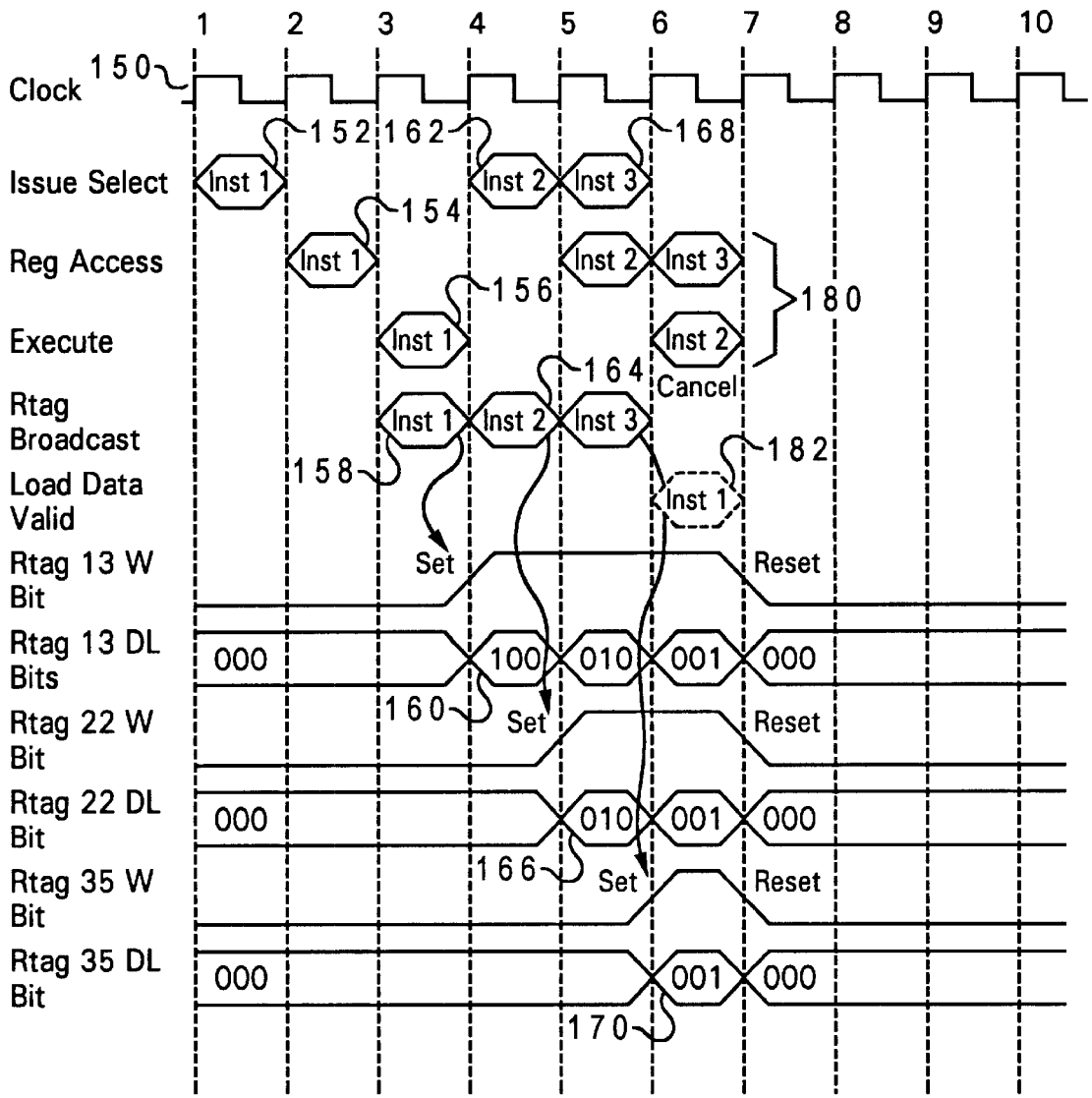
FIG. 7 depicts a timing diagram depicting a load process which results in a cache miss for a particular example.

With reference now to FIG. 7, there is depicted a timing diagram depicting a load process which results in a cache miss for a particular example. In the example illustrated, inst1 loads the data from location g0 into location g1. The rtag of the destination g1 is assigned at register position "13" in the register rename unit. Next, inst2 needs to add the data from location g1 with 4 and stores the result at location g2. Inst2 is dependent on the data loaded in inst1 to location g1. The rtag of the destination g2 is assigned at register position "22" in the register rename unit. Inst3 needs to add the data from location g2 to 4 and stores the result at location g3. Inst3 is directly dependent on data loaded in inst2 to location g2 and indirectly dependent on data loaded in inst1 to location g1. In the case of a cache miss, the data in register position "13" upon which inst2 and inst3 are dependent, is not available. Therefore, inst2 and inst3 must be cancelled until the data is available in g1.

The first through fifth clock cycles depicted in FIG. 7 occur similarly to those illustrated in FIG. 6. However, during the sixth clock cycle when a cache hit is expected, a cache miss is returned as depicted at reference numeral 182. Since the least significant DL bit="1" and data valid="0", any instructions directly and indirectly dependent upon the destination register of inst1 must be cancelled if already issued. In this example, inst2 and inst3 are cancelled as depicted at reference numeral 180. In canceling the instructions, the W bit is set to "0" for each instruction and the DL bits to "0" until the data requested by the load instruction becomes available.

While the invention has been particularly shown and described with reference to a preferred embodiment, it will be understood by those skilled in the art that various changes in form and detail may be made therein without departing from the spirit and scope of the invention. For example, while the present invention has been illustrated in part utilizing a load instruction with instructions dependent upon a cache hit for the load instruction, other primary instructions may be utilized and instructions speculatively issued which are dependent upon a result of execution of the primary instruction.

What is claimed is:

1. A method of speculatively issuing an instruction, said method comprising:

issuing a first instruction;

after a predetermined number of clock cycles from said issuing of said first instruction, speculatively issuing a second instruction, said second instruction being dependent upon a result of an execution of said first instruction, before said result is available; and removing said second instruction from an issue queue if said result of said first instruction execution is not available when needed for execution of said second instruction.

2. The method of claim 1, further comprising:

broadcasting an identifier for a destination of said result of said first instruction execution.

3. The method of claim 2, further comprising:

storing said result of said first instruction execution in said destination; and storing a valid data indicator confirming the validity of said stored result.

4. The method of claim 1, further comprising:

storing in a queue said canceled second instruction until said result is returned for said first instruction execution, such that other instructions that are independent of said first instruction are available for issue and removal from said queue.

5. The method of claim 1, further comprising:

after a second predetermined number of clock cycles from said issuing of said second instruction, speculatively issuing a third instruction, said third instruction being dependent upon a result of an execution of said second instruction, before said result of said execution of said second instruction is available; and removing said third instruction from an issue queue if said result of said second instruction is not available when needed for executing said third instruction.

6. A system for speculatively issuing an instruction, said system comprising:

means for issuing a first instruction;

means for, after a predetermined number of clock cycles from said issuing of said first instruction, speculatively issuing a second instruction, said second instruction being dependent upon a result of an execution of said first instruction, before said result is available; and means for removing said second instruction from an issue queue if said result of said first instruction execution is not available when needed for execution of said second instruction.

7. The system of claim 6, further comprising:

means for broadcasting an identifier for a destination of said result of said first instruction execution.

8. The system of claim 6, further comprising:

means for storing said result of said first instruction execution in said destination; and means for storing a valid data indicator confirming the validity of said stored result.

9. The system of claim 6, further comprising:

means for storing in a queue said canceled second instruction until said result is returned for said first instruction, such that other instructions that are independent of said first instruction are available for issue and removal from said queue.

10. The system of claim 6, further comprising:

means for, after a second predetermined number of clock cycles from said issuing of said second instruction, speculatively issuing a third instruction, said third instruction being dependent upon a result of an execution of said second instruction, before said result of said execution of said second instruction is available; and means for removing said third instruction from an issue queue if said result of said second instruction is not available when needed for executing said third instruction.

* * * * *